Patented Feb. 18, 1947

2,416,239

UNITED STATES PATENT OFFICE 2,416,239

5-NITRO-2-FURALDEHYDE THIOSEMI-CARBAZONE

William B. Stillman and Albert B. Scott, Norwich, N. Y., assignors, by mesne assignments, to Eaton Laboratories, Inc., Norwich, N. Y., a corporation of New York No Drawing. Original application August 28, 1945, Serial No. 613,205. Divided and this application October 25, 1946, Serial No. 705,796

1 Claim. (Cl. 260—345)

This invention relates to a new chemical compound, 5-nitro-2-furaldehyde thiosemicarbazone, described by the formula:

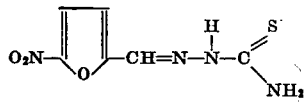

We have made the discovery that this new compound, while sharing the antiseptic properties which are common to many nitrofurans, is distinguished from most other nitrofurans by its effectiveness against infections when administered orally. In doses well below the toxic limit, it has proved highly effective in the treatment of streptococcus and trypanosome infections, and is a valuable chemotherapeutic agent.

The new compound is made as follows:

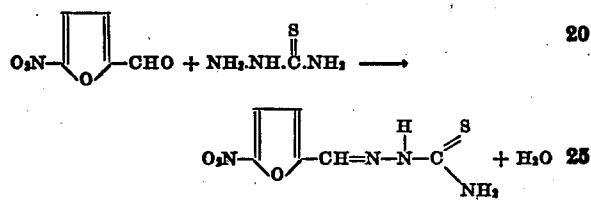

To a solution of 5.2 g. (0.037 mole) of 5-nitro-furfural in 100 cc. of 50% alcohol is added the equivalent quantity, 3.4 g., of thiosemicarbazide. The mixture is warmed on a steam bath until the orange thiosemicarbazone precipitates, and then for five minutes longer. The mixture then is allowed to cool to room temperature, is filtered, and the product is washed with 50% alcohol. The theoretical quantity, 7.9 g., of 5-nitro-2-furaldehyde thiosemicarbazone is thereby obtained as tiny orange prisms. The compound has no well-defined M. P., but begins to darken in color at approximately 200° and is entirely black at 250°; solubility in water, 1:30,000.

This application is a division of our application Serial No. 613,205, filed August 28, 1945, as a continuation-in-part of our applications filed May 17, 1944, and bearing Serial Nos. 536,046, 536,047 and 536,048.

What is claimed is:

5-nitro-2-furaldehyde thiosemicarbazone represented by the formula:

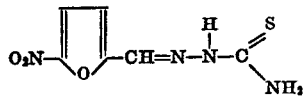

WILLIAM B. STILLMAN.
ALBERT B. SCOTT.